(12) United States Patent
Herrera

(10) Patent No.: US 9,157,367 B2
(45) Date of Patent: Oct. 13, 2015

(54) TURBINE INLET AIR FILTER SYSTEM WITH ELBOW ACCESS GATE

(75) Inventor: Oswaldo Herrera, Qro (MX)

(73) Assignee: General Electric Company, Schenectady, NY (US)

( * ) Notice: Subject to any disclaimer, the term of this patent is extended or adjusted under 35 U.S.C. 154(b) by 605 days.

(21) Appl. No.: 13/547,136

(22) Filed: Jul. 12, 2012

(65) Prior Publication Data

US 2014/0017068 A1   Jan. 16, 2014

(51) Int. Cl.
*F02C 7/05* (2006.01)

(52) U.S. Cl.
CPC .............. *F02C 7/05* (2013.01); *F05D 2230/72* (2013.01)

(58) Field of Classification Search
CPC .............. F01D 25/32; F05D 2260/607; F05D 2230/72; F02C 7/05
See application file for complete search history.

(56) References Cited

U.S. PATENT DOCUMENTS

| 7,625,173 | B2 | 12/2009 | Mehring |
| 2010/0037924 | A1 | 2/2010 | Gebhardt et al. |
| 2010/0102835 | A1 | 4/2010 | Chillar et al. |
| 2010/0154631 | A1* | 6/2010 | Chillar et al. ............ 95/63 |
| 2011/0061816 | A1* | 3/2011 | Duesel et al. ........... 159/4.01 |

* cited by examiner

*Primary Examiner* — Edward Look
*Assistant Examiner* — Juan G Flores
(74) *Attorney, Agent, or Firm* — Sutherland Asbill & Brennan LLP

(57) ABSTRACT

The present application provides a turbine inlet air filter system for filtering a flow of air about a compressor. The turbine inlet air filter system may include an inlet filter house and an inlet duct extending from the inlet filter house to the compressor. The inlet duct may include an air elbow with an elbow gate thereon.

17 Claims, 2 Drawing Sheets

TURBINE INLET AIR FILTER SYSTEM WITH ELBOW ACCESS GATE

TECHNICAL FIELD

The present application and the resultant patent relate generally to gas turbine engines and more particularly relate to a turbine inlet air filter system with an elbow access gate for providing easy access to internal turbine components and the like without complex disassembly procedures.

BACKGROUND OF THE INVENTION

Power generation equipment, such as a gas turbine engine, may use a large amount of intake air to support the combustion process. Impure air laden with dust particles, salt, and other types of contaminants, however, may damage the compressor blades and other types of power plant equipment components via corrosion, erosion, and the like. Such component damage may reduce the life expectancy and performance of the overall gas turbine engine. To avoid such a problem, inlet air filtration systems thus may be used upstream of the compressor. The inlet air flow generally passes through a series of filters and screens to assist in removing the contaminants before they can reach the compressor. Further, the velocity and pressure of the inlet air flow also may be adjusted.

During maintenance or repair of the compressor, however, known inlet air filter systems generally require disassembly in whole or in part so as to access the rotor or other components. Such a procedure requires a significant amount of time and labor costs. For example, removal of an air inlet elbow adjacent to an inlet filter house of an inlet air filter system generally requires a crane and several operators. Moreover, the procedure also may present somewhat of a safety risk for the operators given the weight and height of the components.

There is thus a desire for an improved turbine inlet air filter system. Such an improved system may provide easy access to the components of the compressor while effectively filtering the intake air of contaminates and the like for efficient, long term operation.

SUMMARY OF THE INVENTION

The present application and the resultant patent thus provide a turbine inlet air filter system for filtering a flow of air about a compressor. The turbine inlet air filter system may include an inlet filter house and an inlet duct extending from the inlet filter house to the compressor. The inlet duct may include an air elbow with an elbow gate thereon.

The present application and the resultant patent further provide a gas turbine engine. The gas turbine engine may include a compressor and a turbine inlet air filter system in communication with the compressor. The turbine inlet air filter system may include an inlet filter house and an inlet duct with an elbow gate thereon.

The present application and the resultant patent further provide a turbine inlet air filter system for filtering a flow of air about a compressor. The turbine inlet air filter system may include an inlet filter house and an inlet duct extending from the inlet filter house to the compressor. The inlet duct may include an air elbow with an elbow gate thereon. The elbow gate may include a horizontal portion heading towards the inlet filter house and a vertical portion heading towards the compressor. The elbow gate also may be sized for a rotor shaft of the compressor to pass therethrough.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
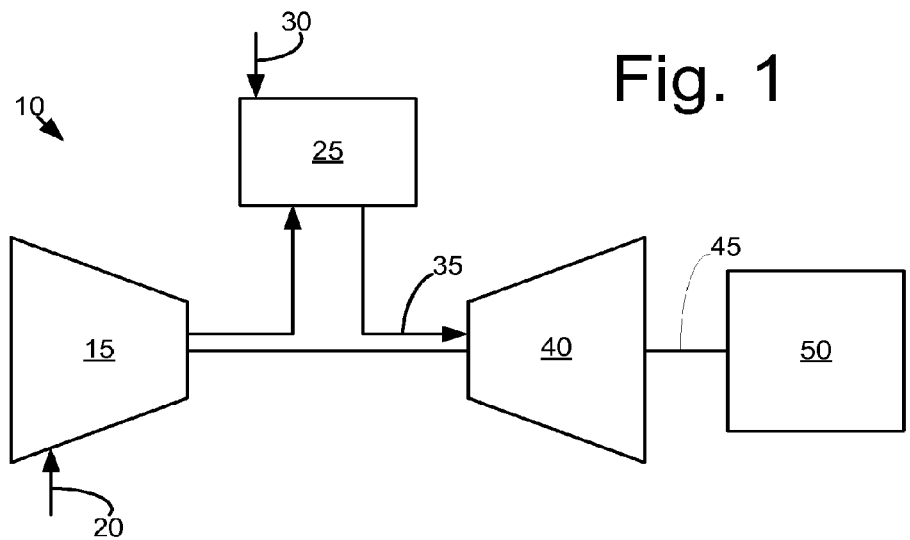
FIG. 1 is a schematic diagram of a gas turbine engine showing a compressor, a combustor, and a turbine.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, various types of syngas, and/or other types of fuels. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
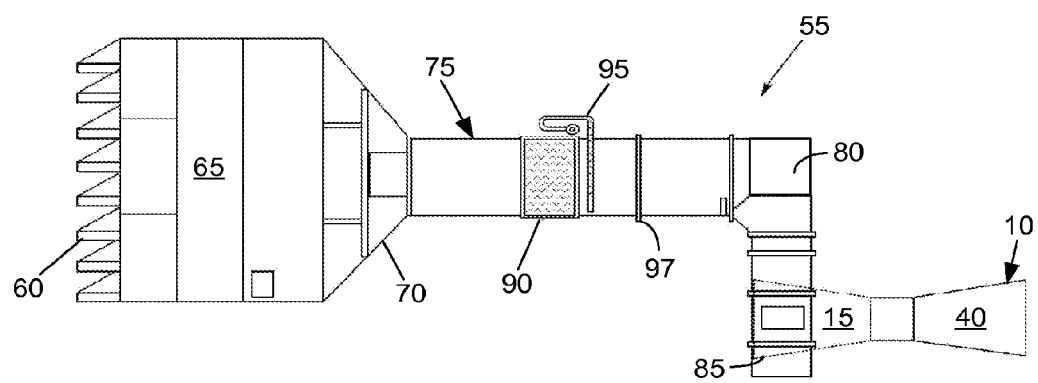
FIG. 2 is a schematic diagram of a gas turbine inlet air filter system as may be used with the gas turbine engine of FIG. 1.

FIG. 2 shows a turbine inlet air filter system 55. The turbine inlet air filter system 55 may include a weather hood 60 mounted on an inlet filter house 65 for the incoming flow of air 20 to pass therethrough. The weather hood 60 may prevent weather elements such as rain, snow, and the like from entering therein. The inlet filter house 65 may remove foreign objects and debris from the flow of air 20. The inlet filter house 65 also may have a transition piece 70 with a reducing cross-section. The turbine inlet air filter system 55 may include an inlet duct 75. The inlet duct may extend downstream of the transition piece 70. The transition piece 70 and the inlet duct 75 may adjust the velocity and pressure of the flow of air 20.

The inlet duct 75 may include an inlet air elbow 80. The inlet air elbow 80 may extend downwardly at about a ninety degree angle (90°) towards an inlet 85 of the compressor 15. The turbine inlet air filtering system 55 also may include a silencer 90 and an inlet bleed heat system 95 positioned about the inlet duct 75. A number of screens 97 and the like also may be used herein so as to assist in preventing debris and contaminants from reaching the inlet 85 of the compressor 15. The turbine inlet air filter system 55 and the components described herein are for the purpose of example only. Other types of intake air filtering systems may be used herein with other components and other configurations.

Figure 3:
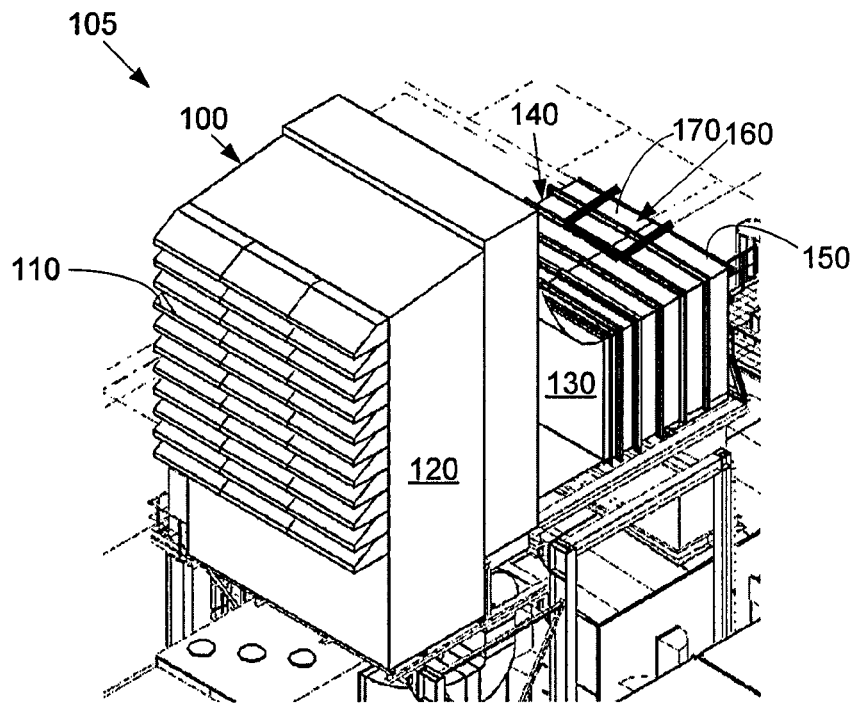
FIG. 3 is a perspective view of a gas turbine inlet air filter system as may be described herein.
Figure 4:
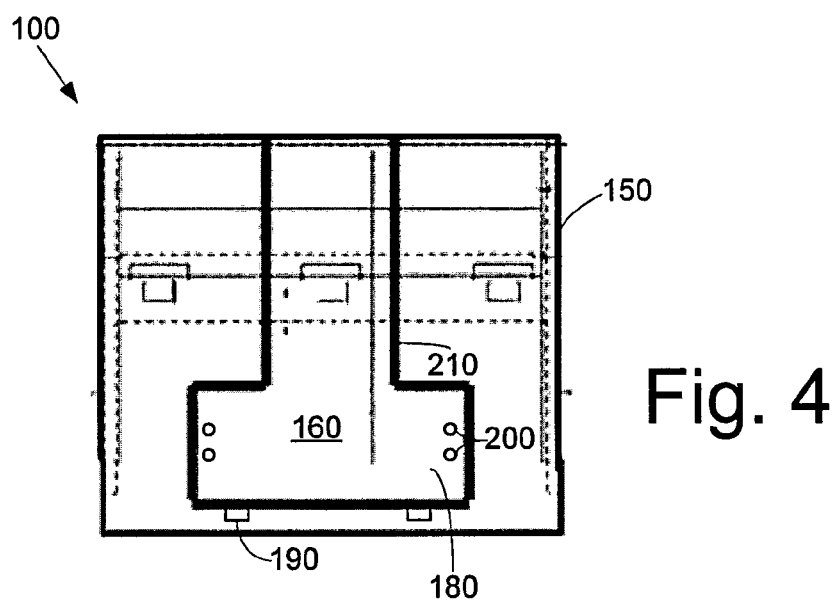
FIG. 4 is a partial plan view of the gas turbine inlet air filter system of FIG. 3.

FIGS. 3 and 4 show a turbine inlet air filter system 100 as may be described herein. The turbine inlet air filter system 100 may be used with a gas turbine engine 105 such as that described above. The turbine inlet air filter system 100 also may be used with other types of power generation equipment and/or any type of device that needs a ready supply of filtered air.

The turbine inlet air filter system 100 also may include a weather hood 110 positioned about an inlet filter house 120 with a transition piece 130. The turbine inlet filter system 100 also may include an inlet duct 140 extending from the transition piece 130 to the inlet 85 of the compressor 15. The inlet duct 140 may include an air elbow 150. The air elbow 150 may take a substantially ninety degree (90°) turn downwards towards the compressor 15. Other components and other configurations may be used herein including, but not limited to, the silencer 90, the inlet bleed heat system 95, the screens 97, and the like The inlet air filtering system 100 also may include an elbow gate 160 positioned about the air elbow 150 of the inlet duct 140. The elbow gate 160 may include a horizontal portion 170 extending away from the inlet filter house 120 and a vertical portion 180 extending towards the compressor 115. (The terms "horizontal" and "vertical" denote relative as opposed to absolute positions.) The horizontal portion 170 and the vertical portion 180 may have about a ninety degree (90°) angle therebetween, but any relative angle may be used herein largely in accord with the configuration of the air elbow 150. Moreover, the angle may vary according to the application. The elbow gate 160 may have any size, shape, or configuration. The elbow gate 160 may be made out of the same material as the air elbow 150 although other materials may be used herein.

The elbow gate 160 may be attached to the air elbow 150 via any type of conventional connection means. For example, a number of hinges 190 may be used such that the elbow gate 160 may swing open. Moreover, a number of bolts 200, screws, and the like also may be used to secure the elbow gate 160 to the air elbow 150. The elbow gate 160 may be a unitary element or multiple elements joined together in a conventional fashion. The elbow gate 160 may be substantially sealed with respect to the air elbow 150 so as to prevent the loss of the intake air 20 as it flows through the inlet duct 140. Any type of seal mechanisms 210 may be used herein. Other components and other configurations also may be used herein.

In use, the elbow gate 160 may remain sealed during operation of the gas turbine engine 10. When access to the internal components of the gas turbine engine 10 is required for maintenance, repair, and the like, the elbow gate 160 may be opened and/or removed so as to provide access thereto. The elbow gate 160 thus may be sized to allow for the removal of the internal components therein including the rotor shaft 50 and the components thereon. The use of the elbow gate 160 in the turbine inlet air filter system 100 thus avoids removal of the entire air elbow 150 and other component positioned about the inlet duct 140. Given such, the time required to remove such internal turbine components may be substantially shortened while overall workplace safety may be improved. Moreover, the additional costs required for the installation of the elbow gate 160 may be substantially outweighed by the time and labor savings provided herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof

I claimed:

1. A turbine inlet air filter system for filtering a flow of air about a compressor, comprising:
an inlet filter house; and
an inlet duct extending from the inlet filter house to the compressor;
the inlet duct comprising an air elbow with about a ninety degree bend, and an elbow gate thereon, wherein the elbow gate is positioned such that a first portion of the elbow gate forms part of a top surface of the air elbow, and a second portion of the elbow gate forms part of a side surface of the air elbow that is vertically oriented.

2. The turbine inlet air filter system of claim 1, wherein the elbow gate comprises a horizontal portion heading towards the inlet filter house and a vertical portion heading towards the compressor.

3. The turbine inlet air filter system of claim 1, wherein the elbow gate comprises a seal mechanism thereon.

4. The turbine inlet air filter system of claim 1, wherein the elbow gate comprises one or more hinges configured to rotate the first portion of the elbow gate away from the top surface of the inlet duct.

5. The turbine inlet air filter system of claim 1, wherein the elbow gate comprises a plurality of bolts.

6. The turbine inlet air filter system of claim 1, wherein the inlet filler house comprises a weather hood.

7. The turbine inlet air filter system of claim 1, wherein the inlet filter house comprises a transition piece.

8. The turbine inlet air filter system of claim 1, wherein the inlet duct leads to an inlet of the compressor.

9. The turbine inlet air filter system of claim 1, wherein the inlet duct comprises one or more screens therein.

10. The turbine inlet air filter system of claim 1, wherein the inlet duct comprises a silencer and/or an inlet bleed heat system.

11. The turbine inlet air filter system of claim 1, wherein the elbow gate is sized for a rotor shaft of the compressor to pass therethrough.

12. A gas turbine engine, comprising:
a compressor; and
a turbine inlet air filter system in communication with the compressor;
the turbine inlet air filter system comprising an inlet filter house and an inlet duct with an elbow gate thereon, the inlet duct comprising an air elbow with about a ninety degree bend, and an elbow gate thereon, wherein the elbow gate is positioned such that a first portion of the elbow gate forms part of a top surface of the air elbow, and a second portion of the elbow gate forms part of a side surface of the air elbow that is vertically oriented.

13. The gas turbine engine of claim 12, wherein the inlet duct extends from the inlet filter house to the compressor.

14. The gas turbine engine of claim 12, wherein the elbow gate comprises a horizontal portion heading towards the inlet filter house and a vertical portion heading towards the compressor.

15. The gas turbine engine of claim 12, wherein the elbow gate comprises a seal mechanism thereon.

16. The gas turbine engine of claim 12, wherein the elbow gate is sized for a rotor shaft of the compressor to pass therethrough.

17. A turbine inlet air filter system for filtering a flow of air about a compressor, comprising:
an inlet filter house; and
an inlet duct extending from the inlet filter house to the compressor;
the inlet duct comprising an air elbow comprising an air elbow with about a ninety degree bend and with an elbow gate thereon;
the elbow gate comprising a horizontal portion heading towards the inlet filter house and a vertical portion heading towards the compressor, wherein the elbow gate is positioned such that the horizontal portion of the elbow gate forms part of a top surface of the air elbow, and the vertical portion of the elbow gate forms part of a side surface of the air elbow that is vertically oriented; and
the elbow gate sized for a rotor shaft of the compressor to pass therethrough.

\* \* \* \* \*